(12) United States Patent
Murata

(10) Patent No.: US 11,285,763 B2
(45) Date of Patent: Mar. 29, 2022

(54) PNEUMATIC TIRE

(71) Applicant: The Yokohama Rubber Co., LTD., Tokyo (JP)

(72) Inventor: Takahisa Murata, Hiratsuka (JP)

(73) Assignee: The Yokohama Rubber Co., LTD.

( * ) Notice: Subject to any disclaimer, the term of this patent is extended or adjusted under 35 U.S.C. 154(b) by 475 days.

(21) Appl. No.: 15/316,104

(22) PCT Filed: Apr. 20, 2015

(86) PCT No.: PCT/JP2015/062011
§ 371 (c)(1),
(2) Date: Dec. 2, 2016

(87) PCT Pub. No.: WO2015/186443
PCT Pub. Date: Dec. 10, 2015

(65) Prior Publication Data
US 2017/0120688 A1 May 4, 2017

(30) Foreign Application Priority Data
Jun. 2, 2014 (JP) .............................. JP2014-114241

(51) Int. Cl.
*B60C 11/12* (2006.01)
*B60C 11/03* (2006.01)
*B60C 11/13* (2006.01)

(52) U.S. Cl.
CPC ...... *B60C 11/1263* (2013.01); *B60C 11/0302* (2013.01); *B60C 11/0304* (2013.01); *B60C 11/0306* (2013.01); *B60C 11/1204* (2013.01); *B60C 11/12* (2013.01); *B60C 11/1236* (2013.01); *B60C 11/1384* (2013.01); *B60C 11/1392* (2013.01); *B60C 2011/0341* (2013.01); *B60C 2011/0358* (2013.01); *B60C 2011/0362* (2013.01); *B60C 2011/0369* (2013.01);
(Continued)

(58) Field of Classification Search
CPC .. B60C 11/0306; B60C 11/12; B60C 11/0304
See application file for complete search history.

(56) References Cited

U.S. PATENT DOCUMENTS 5,293,918 A * 3/1994 Tsuda .................. B60C 11/0309
152/209.15
5,373,882 A * 12/1994 Nakagawa .......... B60C 11/0302
152/209.28
(Continued)

FOREIGN PATENT DOCUMENTS

CN 102649389 8/2012
CN 102756616 10/2012
(Continued)

OTHER PUBLICATIONS

International Search Report for International Application No. PCT/JP2015/062011 dated Jul. 21, 2015, 4 pages, Japan.

*Primary Examiner* — Jodi C Franklin
(74) *Attorney, Agent, or Firm* — Thorpe North & Western

(57) ABSTRACT

A pneumatic tire includes an inclined groove disposed in a first land portion and/or a second land portion which includes at least two bent portions. A sipe is disposed in the first land portion and/or the second land portion so as to intersect the inclined groove at 90°±30°. The sipe includes at least one bent portion.

26 Claims, 1 Drawing Sheet

(52) U.S. Cl.
CPC .......... *B60C 2011/0374* (2013.01); *B60C 2011/0381* (2013.01); *B60C 2011/0383* (2013.01); *B60C 2011/0388* (2013.01); *B60C 2011/129* (2013.01); *B60C 2011/1213* (2013.01)

(56) References Cited

U.S. PATENT DOCUMENTS

| | | | | |
|---|---|---|---|---|
| 5,407,005 | A * | 4/1995 | Consolacion | B60C 11/0304 152/209.9 |
| 5,733,393 | A * | 3/1998 | Hubbell | B60C 11/00 152/209.5 |
| 5,849,119 | A * | 12/1998 | Ishida | B60C 11/0302 152/209.1 |
| D453,729 | S * | 2/2002 | Demagall | D12/523 |
| 6,446,689 | B1 * | 9/2002 | Elkurd | B60C 11/0332 152/209.18 |
| 6,450,223 | B1 * | 9/2002 | Landers | B60C 11/0306 152/209.26 |
| 6,481,480 | B1 * | 11/2002 | Schuster | B60C 11/11 152/209.18 |
| 6,983,777 | B2 * | 1/2006 | Ratliff, Jr. | B60C 11/0302 152/209.15 |
| 7,093,631 | B2 * | 8/2006 | Colombo | B60C 11/0306 152/209.18 |
| D630,997 | S * | 1/2011 | Wright | D12/516 |
| 8,555,939 | B2 * | 10/2013 | Hada | B60C 11/0309 152/209.18 |
| 8,820,373 | B2 * | 9/2014 | Mathews | B60C 11/047 152/209.18 |
| 8,857,483 | B2 * | 10/2014 | Ikeda | B60C 11/12 152/209.18 |
| 8,967,210 | B2 * | 3/2015 | Hashimoto | B60C 11/1376 152/209.15 |
| 9,120,355 | B2 * | 9/2015 | Hada | B60C 11/032 |
| 9,216,618 | B2 * | 12/2015 | Suga | B60C 11/033 |
| 9,522,573 | B2 * | 12/2016 | Nishiwaki | B60C 11/0309 |
| 9,889,708 | B2 * | 2/2018 | Kuriyama | B60C 11/0304 |
| 10,696,102 | B2 * | 6/2020 | Kikuchi | B60C 11/0306 |
| D913,204 | S * | 3/2021 | Sareen | D12/527 |
| 2001/0002602 | A1 * | 6/2001 | Nakamura | B60C 11/12 152/209.4 |
| 2003/0094226 | A1 * | 5/2003 | Colombo | B60C 11/0302 152/209.18 |
| 2004/0134579 | A1 * | 7/2004 | Tanaka | B60C 11/00 152/209.1 |
| 2004/0211502 | A1 * | 10/2004 | Ono | B60C 11/11 152/209.19 |
| 2005/0183807 | A1 * | 8/2005 | Hildebrand | B60C 11/13 152/209.2 |
| 2007/0272337 | A1 * | 11/2007 | Bovaird | B60C 11/0304 152/209.18 |
| 2009/0078350 | A1 * | 3/2009 | Ohashi | B60C 11/1218 152/209.18 |
| 2009/0101260 | A1 * | 4/2009 | Ikegami | B60C 11/0306 152/209.18 |
| 2009/0151833 | A1 * | 6/2009 | Sakai | B60C 11/12 152/209.25 |
| 2009/0229721 | A1 * | 9/2009 | Ikeda | B60C 11/0309 152/209.18 |
| 2009/0272474 | A1 * | 11/2009 | Nagai | B60C 11/032 152/209.18 |
| 2010/0186861 | A1 * | 7/2010 | Ishiguro | B60C 11/033 152/209.25 |
| 2011/0308680 | A1 * | 12/2011 | Numata | B60C 11/0318 152/209.17 |
| 2012/0145294 | A1 * | 6/2012 | Takemoto | B60C 11/0306 152/209.18 |
| 2012/0261044 | A1 * | 10/2012 | Numata | B60C 11/04 152/209.8 |
| 2012/0261045 | A1 * | 10/2012 | Matsushita | B60C 11/1392 152/209.18 |
| 2012/0273103 | A1 * | 11/2012 | Ishida | B60C 11/0304 152/209.18 |
| 2012/0273104 | A1 * | 11/2012 | Ishida | B60C 11/04 152/209.18 |
| 2012/0325385 | A1 * | 12/2012 | Ochi | B60C 11/033 152/209.8 |
| 2013/0146192 | A1 * | 6/2013 | Miyoshi | B60C 11/0302 152/209.25 |
| 2014/0090760 | A1 * | 4/2014 | Matrascia | B60C 11/0304 152/209.8 |
| 2014/0137999 | A1 * | 5/2014 | Nishiwaki | B60C 11/12 152/209.8 |
| 2014/0224394 | A1 * | 8/2014 | Ochi | B60C 11/0304 152/209.18 |
| 2016/0152084 | A1 * | 6/2016 | Murata | B60C 11/1236 152/209.8 |
| 2017/0001479 | A1 * | 1/2017 | Takahashi | B60C 11/1392 |
| 2018/0312010 | A1 * | 11/2018 | Furusawa | B60C 11/1204 |
| 2018/0345731 | A1 * | 12/2018 | Oda | B60C 11/033 |
| 2019/0359006 | A1 * | 11/2019 | Uemura | B60C 11/1204 |

FOREIGN PATENT DOCUMENTS

| | | |
|---|---|---|
| JP | 2001-219718 | 8/2001 |
| JP | 2002-264613 | 9/2002 |
| JP | 2003-515486 | 5/2003 |
| JP | 2007-314168 | 12/2007 |
| JP | 2009-012533 | 1/2009 |
| JP | 2010-013099 | 1/2010 |
| JP | 2012-056464 | 3/2012 |
| JP | 4929466 | 5/2012 |
| WO | WO 2001/39996 | 6/2001 |

* cited by examiner

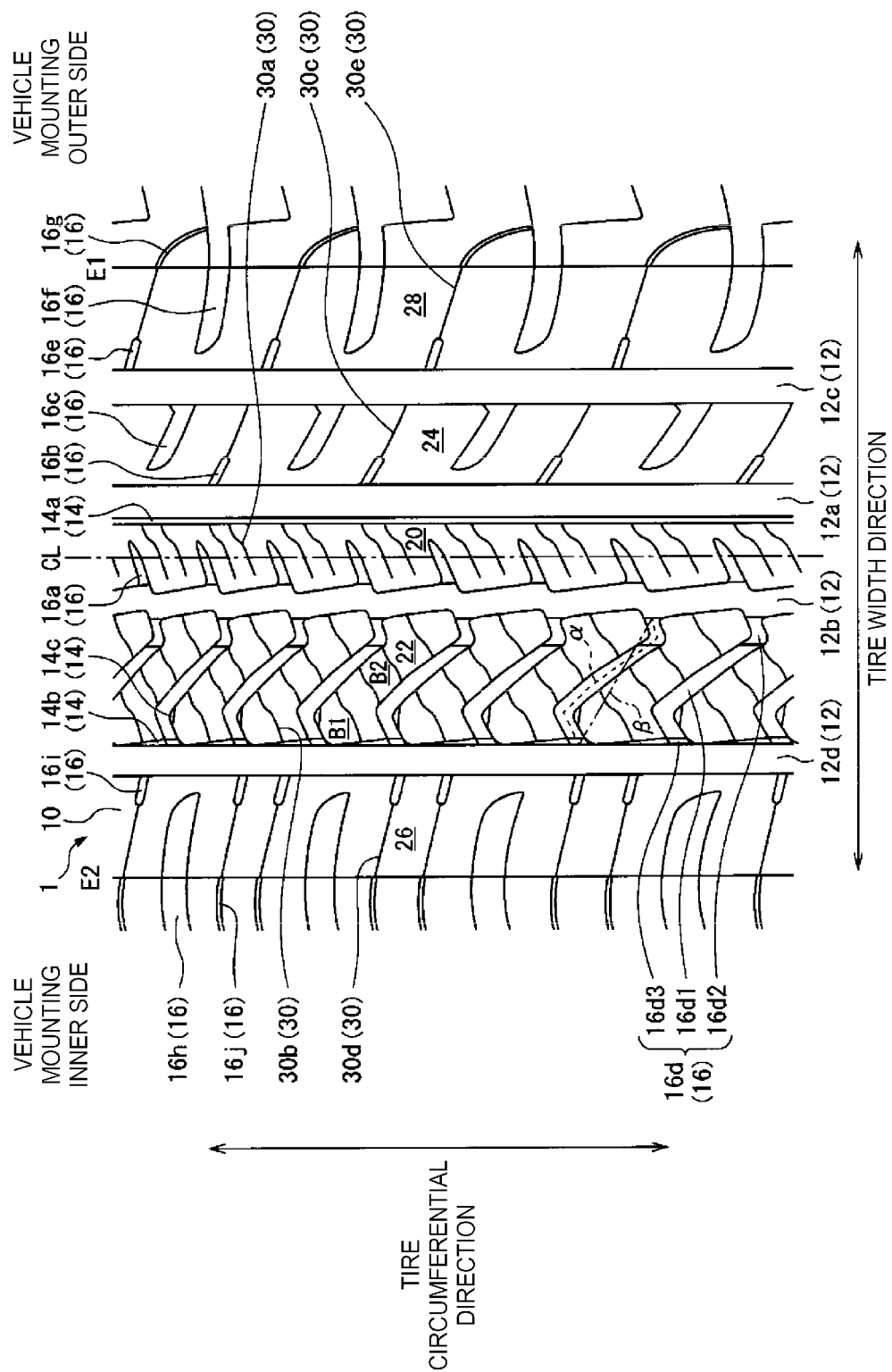

PNEUMATIC TIRE

TECHNICAL FIELD

The present technology relates to a pneumatic tire with enhanced steering stability performance on snow-covered road surfaces and noise-reducing performance.

BACKGROUND ART

Technologies for improving steering stability performance on snow-covered road surfaces are known (for example, see Japanese Patent No. 4929466B). The technology disclosed in Japanese Patent No. 4929466B is a technology in which steering stability performance on dry road surfaces and steering stability performance on snow-covered road surfaces are improved by defining predetermined blocks and ribs on each of the vehicle mounting sides, and adjusting the groove area ratio.

Typically, to improve steering stability performance on snow-covered road surfaces, groove area is increased, thus increasing snow column shear force. However, increasing groove area tends to negatively affect noise-reducing performance.

For example, Japanese Patent No. 4929466B describes technology in which the shape of the land portions and groove area ratio are specified to improve steering stability performance on snow-covered road surfaces, but it is unclear if this technology also exhibits superior noise-reducing performance.

SUMMARY

The present technology provides a pneumatic tire capable of achieving good steering stability performance on snow-covered road surfaces and noise-reducing performance in a compatible manner.

A pneumatic tire according to the present technology comprises at least four circumferential grooves; a plurality of inclined grooves that communicate with the circumferential grooves; and a rib that includes a tire equatorial plane, a first land portion disposed to one side of the rib in a tire width direction, and a second land portion disposed to the other side of the rib in the tire width direction, wherein the rib, the first land portion, and the second land portion are defined by the circumferential grooves and the plurality of inclined grooves. An inclined groove of the plurality of inclined grooves disposed in the first land portion and/or the second land portion includes at least two bent portions. A sipe is disposed in the first land portion and/or the second land portion so as to intersect the inclined groove at 90°±30°. The sipe includes at least one bent portion.

In a pneumatic tire according to the present technology, the shape of the inclined grooves and the sipes are enhanced. As a result, a pneumatic tire according to the present technology can achieve enhanced steering stability performance on snow-covered road surfaces and noise-reducing performance.

BRIEF DESCRIPTION OF DRAWING

FIG. 1 is a plan view illustrating an example of a tread portion of a pneumatic tire according to an embodiment of the present technology.

DETAILED DESCRIPTION

Embodiments of pneumatic tires according to the present technology (including a Basic Embodiment and Additional Embodiments 1 to 10) are described below based on the drawings. Note that the present technology is not limited to these embodiments. The constituents of the embodiments include constituents that can be easily replaced by those skilled in the art and constituents substantially the same as the constituents of the embodiments. In addition, the various embodiments included in the embodiments can be combined as desired within the scope of obviousness by a person skilled in the art.

Basic Embodiment

A pneumatic tire according to a Basic Embodiment of the present embodiment is described below. In the following description, "tire radial direction" refers to a direction orthogonal to the axis of rotation of a pneumatic tire. "Inward in the tire radial direction" refers to a direction toward the axis of rotation in the tire radial direction. "Outward in the tire radial direction" refers to a direction away from the axis of rotation in the tire radial direction. "Tire circumferential direction" refers to the circumferential direction with the axis of rotation as the center axis. Additionally, "tire width direction" refers to a direction parallel to the rotational axis. "Inward in the tire width direction" refers to the direction toward a tire equatorial plane CL (tire equator line) in the tire width direction. "Outward in the tire width direction" refers to the direction away from the tire equatorial plane CL in the tire width direction. Note that "tire equatorial plane CL" refers to the plane that is orthogonal to the rotational axis of the pneumatic tire and that passes through the center of the tire width of the pneumatic tire.

Furthermore, in the present embodiment, "ground contact region" of the pneumatic tire refers to the contact region of the tire surface that comes into contact with the road surface when the tire is fitted to an applicable rim, inflated to an air pressure of from 200 kPa to 250 kPa, and a load having 70% to 90% of the regular load is applied. "Ground contact edge" refers to the outermost position in the tire width direction of the ground contact region.

Here, the applicable rim refers to a "standard rim" prescribed by JATMA (Japan Automobile Tyre Manufacturers Association, Inc.), a "design rim" prescribed by TRA (the Tire and Rim Association, Inc.), or a "measuring rim" prescribed by ETRTO (European Tyre and Rim Technical Organisation). "Regular load" refers to the "maximum load capacity" prescribed by JATMA, the maximum value in "TIRE LOAD LIMITS AT VARIOUS COLD INFLATION PRESSURES" prescribed by TRA, and "LOAD CAPACITY" prescribed by ETRTO.

FIG. 1 is a plan view illustrating an example of a tread portion of a pneumatic tire according to an embodiment of the present technology. In the example illustrated in FIG. 1, a state in which the air pressure is 220 kPa and the applied load is 80% of the regular load is illustrated. A tread portion made of a rubber material (tread rubber) is exposed on the outermost side in the tire radial direction of a pneumatic tire 1, and a surface thereof constitutes a profile of the pneumatic tire 1. The surface of the tread portion forms a tread surface 10 that is the surface that comes into contact with the road surface when a vehicle (not illustrated) on which the pneumatic tire 1 is mounted is driven.

In the example illustrated in FIG. 1, the tread portion has a tread pattern in which the two sides in the tire width direction with the tire equatorial plane CL as an axis are asymmetrical, and a vehicle mounting direction is designated. However, the present embodiment is not limited thereto. In other words, the present embodiment also includes embodiments in which the tread portion has a tread pattern in which the two sides in the tire width direction with the tire equatorial plane CL as an axis are symmetrical and a mounting direction is not designated. In the pneumatic tire 1 illustrated in FIG. 1, the right side is the vehicle mounting outer side, and the left side is the vehicle mounting inner side. Hereinafter, the region on the vehicle mounting outer side (inner side) from the tire equatorial plane CL is referred to as the vehicle mounting outer (inner) side region in FIG. 1.

In the pneumatic tire 1 provided with the tread surface 10 illustrated in FIG. 1, four grooves (also referred to as circumferential grooves below) 12 (12*a*, 12*b*, 12*c*, 12*d*) extending in the tire circumferential direction are disposed. Here, "circumferential groove" refers to a groove with a groove width of 2.0 mm or greater and a groove depth of 5.0 mm or greater.

The circumferential groove 12*a* rectilinearly extends in the tire circumferential direction in the vehicle mounting outer side region. The circumferential groove 12*a* is provided with a chamfered portion 14*a* in a region located inward in the tire width direction that runs across the entire region in the tire circumferential direction. The circumferential groove 12*b* extends in a zigzag manner in the tire circumferential direction in the vehicle mounting inner side region. The circumferential groove 12*c* rectilinearly extends in the tire circumferential direction and is disposed in the vehicle mounting outer side region in a region located outward of the circumferential groove 12*a* in the tire width direction. The circumferential groove 12*d* rectilinearly extends in the tire circumferential direction in the vehicle mounting inner side region in a region located outward of the circumferential groove 12*b* in the tire width direction. The circumferential groove 12*d* is provided with a chamfered portion 14*b* in a region located inward in the tire width direction that runs across the entire region in the tire circumferential direction. Note that in the Basic Embodiment, whether the circumferential grooves 12*a* to 12*d* rectilinearly extend or extend in a zigzag manner in the tire circumferential direction is an optional design choice.

Furthermore, a plurality of grooves (including grooves extending in the tire width direction, also referred to as "inclined grooves" below) 16 (16*a*, 16*b*, 16*c*, 16*d*, 16*e*, 16*f*, 16*g*, 16*h*, 16*i*, 16*j*) that communicate with the circumferential grooves 12 (12*a*, 12*b*, 12*c*, 12*d*) and are inclined with respect to the tire circumferential direction are disposed in the tread surface 10. In the example illustrated in FIG. 1, 10 types are disposed. Here, "inclined groove" refers to a groove with a groove width of 2.0 mm or greater and a groove depth of 5.0 mm or greater. A raised bottom portion (raised bottom portion 16*d*2 and the like) in the inclined groove described later has a groove depth of 1.5 mm or greater.

The inclined groove 16*a* extends from the inner side of the circumferential groove 12*b* in the tire width direction toward the vehicle mounting outer side and terminates within the land portion. The inclined groove 16*b* is located between the circumferential grooves 12*a* and 12*c*, and extends from the circumferential groove 12*a* outward in the tire width direction and terminates within the land portion. The inclined groove 16*c* has a greater groove width than the inclined groove 16*b*. The inclined groove 16*c* is located between the circumferential grooves 12*a* and 12*c* and between inclined grooves 16*b* adjacent in the tire circumferential direction. The inclined groove 16*c* extends from the circumferential groove 12*c* inward in the tire width direction and terminates within the land portion.

The inclined groove 16*d* is located between the circumferential grooves 12*b*, 12*d*, and is constituted by a deep groove portion 16*d*1 and raised bottom portions (shallow groove portions) 16*d*2, 16*d*3 adjacent thereto on each side in the tire width direction. The inclined groove 16*d* communicates with the circumferential grooves 12*b*, 12*d* via the raised bottom portions 16*d*2, 16*d*3, respectively. In the example illustrated in FIG. 1, a chamfered portion 14*c* is disposed adjacent to the deep groove portion 16*d*1 of the inclined groove 16*d*.

The inclined groove 16*e* extends from the outer side of the circumferential groove 12*c* in the tire width direction outward in the tire width direction along an imaginary extension line of the inclined groove 16*b*, and terminates within the land portion. The inclined groove 16*f* extends from a position within the land portion located outward of the circumferential groove 12*c* in the tire width direction outward in the tire width direction along an imaginary extension line of the inclined groove 16*c* and crosses the ground contact edge E. In the outermost portion in the tire width direction, the inclined groove 16*f* bends at approximately a right angle and extends substantially in the tire circumferential direction. The inclined groove 16*g* extends from a position on the ground contact edge E1 on an imaginary extension line outward from the inclined groove 16*e* in the tire width direction. The inclined groove 16*g* extends outward in the tire width direction and communicates with the inclined groove 16*f*.

The inclined groove 16*h* is disposed in the vehicle mounting inner side region and extends across the ground contact edge E2 from outward to inward in the tire width direction. The circumferential pitch length of the inclined groove 16*h* is twice that of the inclined groove 16*d*. The inclined groove 16*i* extends from the outer side of the circumferential groove 12*d* in the tire width direction and terminates within the land portion at a position inward from the ground contact edge E2 in the tire width direction. Two inclined grooves 16*i* are disposed between inclined grooves 16*h* adjacent in the tire circumferential direction. The inclined groove 16*j* extends from a position on the ground contact edge E2 on an imaginary extension line outward from the inclined groove 16*i* in the tire width direction. The inclined groove 16*g* extends outward in the tire width direction.

Note that the raised bottom portions 16*d*2, 16*d*3 and constituents located outward of the outermost circumferential grooves 12*c*, 12*d* in the tire width direction (for example, the inclined grooves 16*e* to 16*j*) are only examples and are not essential constituents of the Basic Embodiment, but optional constituents.

The tread pattern of the pneumatic tire 1 illustrated in FIG. 1 is provided with the circumferential grooves 12, the chamfered portions 14, and the inclined grooves 16. Specifically, a rib 20 including the tire equatorial plane CL, a first land portion 22 (row of blocks) located to one side of the rib 20 in the tire width direction (the left side in FIG. 1), a second land portion 24 (rib) located to the other side of the rib 20 in the tire width direction (the right side in FIG. 1), an inner shoulder rib 26 located outward of the first land portion 22 in the tire width direction, and an outer shoulder rib 28 located outward of the second land portion 24 in the tire width direction are defined in the pneumatic tire 1. Note that in the example illustrated in FIG. 1, the first land portion 22 is a row of blocks and the second land portion 24 is a rib. However the present embodiment is not limited to this configuration. In other words, the first land portion 22 and the second land portion 24 may both be a row of blocks or both be a rib.

Note that a plurality of sipes 30 (30a, 30b, 30c, 30d, 30e) are disposed in the rib 20, the first land portion 22, the second land portion 24, the inner shoulder rib 26, and the outer shoulder rib 28 as illustrated in FIG. 1. Here, "sipe" refers to a groove having a groove width of 0.5 mm or greater and less than 1.5 mm and a groove depth of 1.0 mm or greater and less than 10.0 mm.

In the Basic Embodiment with a configuration such as that described above, the inclined groove 16d disposed in the first land portion 22 and/or the second land portion 24 (the first land portion 22 in the example illustrated in FIG. 1) includes at least two bent portions (two in the example illustrated in FIG. 1).

Additionally, in the Basic Embodiment as illustrated in FIG. 1, the sipe 30b is disposed in the first land portion 22 and/or the second land portion 24 (the first land portion 22 in the example illustrated in FIG. 1) so as to intersect the inclined groove 16d at 90°±30°.

Furthermore, in the Basic Embodiment as illustrated in FIG. 1, the sipe 30b includes at least one bent portion.

Actions

In the Basic Embodiment as illustrated in FIG. 1, by the inclined groove 16d disposed in a specific land portion (the first land portion 22 in the example illustrated in FIG. 1) being provided with at least two bent portions, the length of the inclined groove 16d can be sufficiently ensured. Thus, the edges of the blocks defined by the inclined grooves 16d can be sufficiently rendered with edge components in the tire circumferential direction as well as edge components in the tire width direction. As a result, it is possible not only to sufficiently ensure driving performance and braking performance on snow-covered road surfaces due to the edge components in the tire width direction, but also to enhance turning performance on snow-covered road surfaces due to the edge components in the tire circumferential direction (Action 1).

Additionally, by providing the bent portion as described above and sufficiently ensuring the length of the inclined groove 16d, the groove area of the inclined groove 16d is sufficiently ensured. As a result, popping sounds from the inclined groove 16d are dispersed and ground reaction force at the ground contact surface is dispersed, thus dispersing hitting sounds. Thus, popping sounds and hitting sounds caused by the tread pattern can be reduced (Action 2).

Additionally, in the Basic Embodiment as illustrated in FIG. 1, by disposing the sipe 30b in the specific land portion 22 so as to intersect with the inclined groove 16d at 90°±30°, edge X of the block defined by the inclined groove 16d and edge Y formed by the sipe 30b are made orthogonal to each other (edge X, Y are not illustrated). Thus, in the first land portion 22, the gripping force on snow-covered road surfaces exhibited by the hypothetical sum of the edges X and the edges Y is made uniform across components in the tire circumferential direction and components in the tire width direction (Action 3).

Additionally, in the Basic Embodiment as illustrated in FIG. 1, by the sipe 30b, which is orthogonal to the inclined groove 16d, being provided with at least one bent portion, the length of the sipe 30b can be sufficiently ensured. Thus, the edges formed by the sipe 30b can be rendered with edge components in the tire circumferential direction as well as edge components in the tire width direction. As a result, it is possible not only to sufficiently ensure driving performance and braking performance on snow-covered road surfaces due to the edge components in the tire width direction, but also to enhance turning performance on snow-covered road surfaces due to the edge components in the tire circumferential direction (Action 4).

Accordingly, in the Basic Embodiment, Actions 1, 3, and 4 enable superior steering stability performance on snow-covered road surfaces to be exhibited, and Action 2 enables superior noise-reducing performance to be exhibited.

Note that the pneumatic tire (not illustrated) according to the Basic Embodiment as described above has the same meridian cross-section form as that of a conventional pneumatic tire. Here, "meridian cross-section form of the pneumatic tire" refers to the cross-sectional shape of the pneumatic tire on a plane normal to the tire equatorial plane. The pneumatic tire according to the Basic Embodiment includes a bead portion, a sidewall portion, a shoulder portion, and the tread portion in that order from inward to outward in the tire radial direction when viewed in a tire meridian cross section. Also, the pneumatic tire includes, for example, when viewed in a tire meridian cross section, a carcass layer that extends from the tread portion to the bead portions on both sides and is wound around a pair of bead cores, and a belt layer and a belt reinforcing layer formed in that order outward of the carcass layer in the tire radial direction.

Furthermore, the pneumatic tire according to the Basic Embodiment is obtained through normal manufacturing steps including a step of mixing the tire materials, a step of processing the tire materials, a step of molding a green tire, a vulcanization step, an inspection step after vulcanization, and the like. In the production of a pneumatic tire according to the Basic Embodiment, particularly in the vulcanization step, the tread pattern is formed using a mold having a raised and recessed pattern corresponding to the specific inclined grooves and sipes described above.

Preferred Embodiment of Basic Embodiment

The inclined groove disposed in the first land portion and/or the second land portion preferably includes two or three bent portions (two in the example illustrated in FIG. 1). By two or three bent portions being provided, reduction in rigidity in the land portions can be suppressed without excessively increasing the groove area, and thus steering stability performance on snow-covered road surfaces can be efficiently increased.

Additionally, as illustrated in FIG. 1, in the first land portion and/or the second land portion, a sipe is preferably formed so as to intersect (at a right angle) the inclined groove at 90°. By disposing the sipe orthogonal to the inclined groove located in the specific land portion, the gripping force on snow-covered road surfaces exhibited by the hypothetical sum of the edges X and the edges Y are further made uniform across components in the tire circumferential direction and components in the tire width direction. As a result, steering stability performance on snow-covered road surfaces can be further increased.

Furthermore, as illustrated in FIG. 1, at least one end in the tire width direction of the inclined groove disposed in the first land portion and/or the second land portion preferably communicates with the circumferential groove. By disposing at least one end in the tire width direction of the inclined groove located in the specific land portion so that it communicates with the circumferential groove, water drainage performance can be increased.

Additionally, as illustrated in FIG. 1, at least one end in the extension direction of the sipe disposed in the first land portion and/or the second land portion preferably communicates with the inclined groove. By disposing at least one end in the extension direction of the sipe located in the specific land portion so that it communicates with the inclined groove, gripping force can be further increased.

ADDITIONAL EMBODIMENTS

Additional Embodiments 1 to 10 which can be optionally implemented as opposed to the Basic Embodiment of a pneumatic tire according to the present technology are described below.

Additional Embodiment 1

A configuration of the Basic Embodiment is preferably further configured so that, in the first land portion and/or the second land portion, a tortuosity ratio L1/L2 of the inclined groove is specified as being from 1.1 to 1.5, both inclusive, where L1 is the entire length of the inclined groove and L2 is the dimension between opposite end portions of the inclined groove in the tire width direction (Additional Embodiment 1).

Here, "entire length L1 of the inclined groove" refers to the dimension of the line segment traced along a center line of the inclined groove $16d$ in the width direction, as illustrated by dotted line $\alpha$ in FIG. 1. "Dimension L2 between opposite end portions of the inclined groove in the tire width direction" refers to the dimension of a line segment that joins center points in the tire circumferential direction of opposite end portions of the inclined groove $16d$ in the tire width direction, as illustrated by dot-dash line $\beta$ in FIG. 1.

By setting the tortuosity ratio L1/L2 of the inclined groove to 1.1 or greater, the entire length of the inclined groove is further increased. This enables the edge components in the tire width direction and edge components in the tire circumferential direction of the blocks defined by the inclined groove to be even longer. As a result, driving performance and braking performance on snow-covered road surfaces can be improved due to the increase in edge components in the tire width direction, and turning performance on snow-covered road surfaces can be improved due to the increase in edge components in the tire circumferential direction. Thus, steering stability performance on snow-covered road surfaces can be further enhanced.

Additionally, by setting the tortuosity ratio L1/L2 of the inclined groove to 1.1 or greater and further increasing the entire length of the inclined groove, popping sounds from the inclined groove $16d$ can be dispersed, and ground reaction force at the ground contact surface is further dispersed, thus further dispersing hitting sounds. As a result, popping sounds and hitting sounds caused by the tread pattern can be further reduced, and noise-reducing performance can be further enhanced.

By setting the tortuosity ratio L1/L2 of the inclined groove to 1.5 or less, reduction in rigidity in the land portions can be suppressed without excessively increasing the groove area of the inclined groove, and thus steering stability performance on snow-covered road surfaces can be further increased.

Additional Embodiment 2

A configuration combining the Basic Embodiment and the Additional Embodiment 1 is preferably configured so that, in the first land portion and/or the second land portion, a longest extending portion of the inclined groove disposed has an inclination angle with respect to the tire circumferential direction of from 15° to 60°, both inclusive (Additional Embodiment 2). Here, "longest extending portion of the inclined groove" refers to the central portion (portion extending vertically down to the right in FIG. 1) of the inclined groove $16d$ in the tire width direction in the example illustrated in FIG. 1, for example.

By setting the inclination angle of the longest extending portion of the inclined groove with respect to the tire circumferential direction to 15° or greater, the edge components in the tire width direction of the blocks are further enlarged, and thus driving performance and braking performance on snow-covered road surfaces can be increased. By setting the inclination angle of the longest extending portion of the inclined groove with respect to the tire circumferential direction to 60° or less, air is given more time to discharge from the inclined groove when the inclined groove separates from the road surface, thus popping sounds from the inclined groove can be further dispersed. Additionally, by setting the inclination angle to 60° or less, ground reaction force at the ground contact surface is further dispersed, and thus hitting sounds can be further dispersed. Accordingly, in embodiments with an inclination angle of 60° or less, popping sounds and hitting sounds caused by the tread pattern can be further reduced, and noise-reducing performance can be further increased.

Note that the portions other than the longest extending portion of the inclined groove preferably have an inclination angle with respect to the tire circumferential direction of 20° or greater. Here, "portions other than the longest extending portion of the inclined groove" refers to the end portions (two portions extends vertically down to the left) of the inclined groove $16d$ on opposite sides in the tire width direction in the example illustrated in FIG. 1, for example. By setting the inclination angle of the portions other than the longest extending portion of the inclined groove with respect to the tire circumferential direction to 20° or greater, the edge components in the tire width direction of the blocks are further enlarged, and thus driving performance and braking performance on snow-covered road surfaces can be increased.

Additional Embodiment 3

A configuration combining the Basic Embodiment and the Additional Embodiment 1 and/or Additional Embodiment 2 is preferably further configured so that, in the first land portion and/or the second land portion, the number of sipes per unit length in the tire circumferential direction is from 0.02/mm to 0.2/mm, both inclusive (Additional Embodiment 3). Here, "number of sipes per unit length in the tire circumferential direction" refers to a value found by dividing the number of sipes, in an extended state, disposed in the target land portion that are intersected by a straight line extending in the tire circumferential direction by the dimension of the target land portion in the tire circumferential direction.

By setting the number of sipes to 0.02/mm or greater, edges formed by the sipes in the target land portion can be sufficiently ensured. This enables steering stability performance on snow-covered road surfaces to be further enhanced. By setting the number of sipes to 0.2/mm or less, rigidity of the target land portion is sufficiently ensured, and slippage at the land portion upon tire rolling motion is suppressed, thus noise-reducing performance can be further enhanced.

Note that by setting the number of sipes to from 0.03/mm to 0.1/mm, both inclusive, the effects described above can be achieved to a greater degree.

Additional Embodiment 4

A configuration combining the Basic Embodiment and at least any one of the Additional Embodiments 1 to 3 is preferably further configured so that, a tortuosity ratio L3/L4 of the sipe described above is 1.01 or greater, where L3 is the entire length of the sipe and L4 is the dimension between opposite end portions of the sipe in the tire width direction (Additional Embodiment 4). Here, "entire length L3 of the sipe" refers to the dimension of a line segment traced along center positions of the sipe in the width direction in the extension direction thereof. "Dimension L4 between opposite end portions of the sipe in the tire width direction" refers to the dimension of a line segment that joins center points in the tire circumferential direction of opposite end portions of the sipe in the tire width direction.

By setting the tortuosity ratio L3/L4 to 1.01 or greater, the entire length of the sipe is increased, and the edge components in the tire width direction and the edge components in the tire circumferential direction of the edges formed by the sipes can both be made longer. As a result, driving performance and braking performance on snow-covered road surfaces can be improved due to the increase in edge components in the tire width direction, and turning performance on snow-covered road surfaces can be improved due to the increase in edge components in the tire circumferential direction. Thus, steering stability performance on snow-covered road surfaces can be further enhanced.

By setting the tortuosity ratio L3/L4 of the sipe to 1.20 or less, reduction in rigidity in the land portions can be suppressed without excessively increasing the area of the sipe, and thus steering stability performance on snow-covered road surfaces can be further increased.

Additional Embodiment 5

A configuration combining the Basic Embodiment and at least any one of the Additional Embodiments 1 to 4 is preferably further configured so that, as illustrated in FIG. 1, in the first land portion and/or the second land portion (the first land portion 22 in FIG. 1), the area of small block B1 located adjacent to the circumferential groove 12d is 1.05 times or greater than the area of small block B2 located adjacent to only the inclined groove 16d and the sipe 30b (Additional Embodiment 5). Here, "small block" refers to a constituent of a block defined by the circumferential groove and the inclined groove, which is a portion of a block defined by at least one sipe.

In the present embodiment, in the specific land portion, by setting the area of the small block located adjacent to the circumferential groove to 1.05 times or greater than the area of the small block adjacent to only the inclined groove and the sipe, the area of the small block B1, which has a relatively high degree of deformation upon tire rolling motion due to being located adjacent to the relatively wide groove (circumferential groove), is enlarged and thus rigidity is sufficiently ensured. As a result, in particular in the example illustrated in FIG. 1, deformation of the small block B1 upon tire rolling motion is suppressed, and slippage at the small block B1 is suppressed. This enables noise-reducing performance to be further enhanced.

Note that by setting the area of the small block located adjacent to the circumferential groove to 3.0 times or less than the area of the small block located adjacent to only the inclined groove and the sipe, in the specific land portion, uneven wear can be suppressed without making the difference in rigidity across the small blocks too great.

Additional Embodiment 6

A configuration combining the Basic Embodiment and at least any one of the Additional Embodiments 1 to 5 is preferably further configured so that, in the first land portion and/or the second land portion, a line segment that joins the bending points on both sides in the tire circumferential direction of the bent portions of the inclined groove is longer than the maximum width of the inclined groove (Additional Embodiment 6).

In the specific land portion, by setting the line segment that joins the bending points on both sides in the tire circumferential direction of the bent portions of the inclined groove to be longer than the maximum width of the inclined groove, the area of the bent portions, where snow column shear force can be produced more so than the other regions of the inclined groove, can be enlarged. As a result, snow column shear force can be efficiently produced across the entire inclined groove, and thus steering stability performance on snow-covered road surfaces can be further enhanced.

Additional Embodiment 7

A configuration combining the Basic Embodiment and at least any one of the Additional Embodiments 1 to 6 is preferably further configured so that, as illustrated in FIG. 1, in the first land portion and/or the second land portion (the first land portion 22 in FIG. 1), at least one of (all of) the inclined grooves 16d include portions that are adjacent to the circumferential grooves 12b, 12d with a raised bottom (Additional Embodiment 7).

In the example illustrated in FIG. 1, each inclined groove 16d includes the raised bottom portions 16d2, 16d3 in the portions adjacent to the circumferential grooves 12b, 12d, respectively. Accordingly, among the small blocks defined by at least the inclined groove and the sipe, rigidity of the small block B1, which has a relatively high degree of deformation upon tire rolling motion due to being defined by the relatively wide circumferential groove, can be increased. As a result, slippage at the small blocks upon tire rolling motion can be suppressed, and noise-reducing performance can be further enhanced.

Additionally, by disposing the raised bottom portions 16d2, 16d3 in each inclined groove 16d to increase the rigidity of the small block B1, which has relatively high deformation upon tire rolling motion, collapse-deformation of the small block B1 in the tire circumferential direction can be suppressed. As a result, uneven wear caused by such collapse-deformation can be suppressed.

Additional Embodiment 8

A configuration combining the Basic Embodiment and at least any one of the Additional Embodiments 1 to 7 is preferably further configured so that, at least one of the sipes includes a portion adjacent to the inclined groove with a raised bottom (Additional Embodiment 8).

By raising the bottom of at least one sipe at a portion that is adjacent to the inclined groove, a reduction in rigidity in the first land portion and the second land portion caused by the sipe can be suppressed, and slippage at the small blocks upon tire rolling motion and be suppressed, thus noise-reducing performance can be further enhanced.

Additional Embodiment 9

A configuration combining the Basic Embodiment and at least any one of the Additional Embodiments 1 to 8 is preferably further configured so that, as illustrated in FIG. 1, in at least one side in the tire width direction, at least one inclined groove (in FIG. 1, all of the inclined grooves 16*f*, 16*h*) disposed in the land portion located outward in the tire width direction of the outermost circumferential groove in the tire width direction terminate within the land portion at the inner end in the tire width direction (Additional Embodiment 9).

In the example illustrated in FIG. 1, each inclined groove 16*f*, 16*h* terminate within the land portion at the inner end in the tire width direction. As a result, hitting sounds in the shoulder regions can be suppressed, and thus noise-reducing performance can be further enhanced.

Additional Embodiment 10

A configuration combining the Basic Embodiment and at least any one of the Additional Embodiments 1 to 9 is preferably further configured so that, as illustrated in FIG. 1, at least one circumferential groove (in FIG. 1, the circumferential groove 12*b*) on at least one side region in the tire width direction includes at least one bent portion (Additional Embodiment 10).

By at least one circumferential groove on at least one side region in the tire width direction including at least one bent portion, the rib 20 and the first land portion 22 in the example illustrated in FIG. 1, edge components in the tire width direction are formed as well as edge components in the tire circumferential direction. As a result, turning performance on snow-covered road surfaces can be enhanced due to the edge components in the tire circumferential direction, and driving performance and braking performance on snow-covered road surfaces can be sufficiently ensured due to the edge components in the tire width direction. Thus, steering stability performance on snow-covered road surfaces can be further increased.

EXAMPLES

Pneumatic tires according to Working Examples 1 to 11 and a conventional example were manufactured. The pneumatic tires had a tire size of 215/45R17 87W, and the constituents illustrated in FIG. 1 (shape and dimensions vary from those illustrated in FIG. 1) were varied for the following conditions:

(1-1) the number of bent portions in the inclined groove 16*d* disposed in the first land portion 22 and/or the second land portion 24 (also referred to as specific land portions 22, 24) (number of bent portions in the specific inclined groove 16*d*);

(1-2) intersection angle of the sipe 30*b* with the inclined groove 16*d* (sipe 30*b* intersection angle (°));

(1-3) number of bent portions in the sipe 30*b*;

(2) tortuosity ratio L1/L2 of the inclined groove 16*d*;

(3) inclination angle of the longest extending portion of the inclined groove 16*d* with the tire circumferential direction (inclined groove 16*d* longest extending portion inclination angle (°));

(4) number of sipes 30*b* per unit length in the tire circumferential direction (sipe/mm);

(5) tortuosity ratio L3/L4 of the sipe 30*b*;

(6) the area of small block B1 with respect to the area of small block B2 (times);

(7) is the line segment that joins the bending points on both sides in the tire circumferential direction of the bent portions of the inclined groove 16*d* longer than the maximum width of the inclined groove 16*d*? (relationship between line segment L5 between bending points and maximum width L6 (L5 and L6 are not illustrated));

(8) does at least one inclined groove 16*d* include portions adjacent to the circumferential grooves 12*b*, 12*d* with raised bottoms? (Presence of the raised bottom portions 16*d*2, 16*d*3 at both sides in the tire width direction of the inclined groove 16*d*);

(9) does at least one sipe 30*b* include a portion adjacent to the inclined groove 16*d* with a raised bottom? (Presence of a raised bottom portion at both sides in the tire width direction of the sipe 30*b*);

(10) does at least one inclined groove 16*f*, 16*h* terminate within the land portion at the inner end in the tire width direction? (Extension configuration of the inclined grooves 16*f*, 16*h* at the inner end in the tire width direction);

(11) does at least one circumferential groove (circumferential groove 12*a* to 12*d*) on at least one side region in the tire width direction include at least one bent portion (Presence of a bent portion in the circumferential groove 12*b*).

Each of the test tires that were manufactured in this way were fitted to a regular rim (having a rim size of 17×7J), inflated to an internal pressure of 230 kPa, and mounted to a vehicle (front engine front drive type) with the displacement of 1800 cc with a load equal to 75% of the regular load applied, and steering stability performance on dry road surfaces, steering stability performance on snow-covered road surfaces, and steering stability performance on wet road surfaces were evaluated. The results are shown in Table 1.

Steering Stability Performance on Snow-Covered Road Surfaces

Sensory evaluation was carried out by panelists when driving at 40 km/h on snow-covered road surfaces. Then, the results were expressed as index values for evaluation with the result for the conventional example being defined as the reference (100). In the evaluation, higher index values indicate better steering stability performance on snow-covered road surfaces.

Noise-Reducing Performance

The test vehicle was driven on a predetermined test course, and in-vehicle noise was evaluated by the test drivers when coasting from a speed of 100 km/h to 20 km/h. Then, the results were expressed as index values for evaluation with the result for the conventional example being defined as the reference (100). In the evaluation, higher index values indicate better noise-reducing performance.

The results are shown in Tables 1-1 through 1-4.

TABLE 1-1

| Condition No. | | Conventional Example | Working Example 1 | Working Example 2 |
|---|---|---|---|---|
| 1-1 | Number of bent portions in specific inclined groove 16d | 0 | 2 | 2 |
| 1-2 | Sipe 30b intersection angle (°) | 55 | 90 | 90 |
| 1-3 | Number of bent portions in sipe 30b | 0 | 2 | 2 |
| 2 | Tortuosity ratio L1/L2 of inclined groove 16d | 1.05 | 1.05 | 1.3 |
| 3 | Inclined groove 16d longest extending portion inclination angle (°) | 10 | 10 | 10 |
| 4 | Number of sipes 30b per unit length in the tire circumferential direction (sipe/mm) | 0.01 | 0.01 | 0.01 |
| 5 | Tortuosity ratio L3/L4 of sipe 30b | 1.008 | 1.008 | 1.008 |
| 6 | Area of small block B1 with respect to area of small block B2 (times) | 1.03 | 1.03 | 1.03 |
| 7 | Relationship between line segment L5 between bending points and maximum width L6 | L5 = L6 | L5 = L6 | L5 = L6 |
| 8 | Presence of raised bottom portions 16d2, 16d3 at both sides in tire width direction of inclined groove 16d | Absent | Absent | Absent |
| 9 | Presence of raised bottom portion at both sides in tire width direction of sipe 30b | Absent | Absent | Absent |
| 10 | Extension configuration of inclined grooves 16f, 16h at inner end in the tire width direction | Communicate with circumferential groove 12c, 12d | Communicate with circumferential groove 12c, 12d | Communicate with circumferential groove 12c, 12d |
| 11 | Presence of bent portion in circumferential groove 12b | Absent | Absent | Absent |
| Steering stability performance on snow-covered road surfaces | | 100 | 104 | 107 |
| Noise-reducing performance | | 100 | 103 | 107 |

TABLE 1-2

| Condition No. | | Working Example 3 | Working Example 4 | Working Example 5 |
|---|---|---|---|---|
| 1-1 | Number of bent portions in specific inclined groove 16d | 2 | 2 | 2 |
| 1-2 | Sipe 30b intersection angle (°) | 90 | 90 | 90 |
| 1-3 | Number of bent portions in sipe 30b | 2 | 2 | 2 |
| 2 | Tortuosity ratio L1/L2 of inclined groove 16d | 1.3 | 1.3 | 1.3 |
| 3 | Inclined groove 16d longest extending portion inclination angle (°) | 40 | 40 | 40 |
| 4 | Number of sipes 30b per unit length in the tire circumferential direction (sipe/mm) | 0.01 | 0.07 | 0.07 |
| 5 | Tortuosity ratio L3/L4 of sipe 30b | 1.008 | 1.008 | 1.03 |
| 6 | Area of small block B1 with respect to area of small block B2 (times) | 1.03 | 1.03 | 1.03 |
| 7 | Relationship between line segment L5 between bending points and maximum width L6 | L5 = L6 | L5 = L6 | L5 = L6 |
| 8 | Presence of raised bottom portions 16d2, 16d3 at both sides in tire width direction of inclined groove 16d | Absent | Absent | Absent |
| 9 | Presence of raised bottom portion at both sides in tire width direction of sipe 30b | Absent | Absent | Absent |
| 10 | Extension configuration of inclined grooves 16f, 16h at inner end in the tire width direction | Communicate with circumferential groove 12c, 12d | Communicate with circumferential groove 12c, 12d | Communicate with circumferential groove 12c, 12d |
| 11 | Presence of bent portion in circumferential groove 12b | Absent | Absent | Absent |
| Steering stability performance on snow-covered road surfaces | | 109 | 112 | 114 |
| Noise-reducing performance | | 105 | 103 | 102 |

TABLE 1-3

| Condition No. | | Working Example 6 | Working Example 7 | Working Example 8 |
|---|---|---|---|---|
| 1-1 | Number of bent portions in specific inclined groove 16d | 2 | 2 | 2 |
| 1-2 | Sipe 30b intersection angle (°) | 90 | 90 | 90 |
| 1-3 | Number of bent portions in sipe 30b | 2 | 2 | 2 |
| 2 | Tortuosity ratio L1/L2 of inclined groove 16d | 1.3 | 1.3 | 1.3 |
| 3 | Inclined groove 16d longest extending portion inclination angle (°) | 40 | 40 | 40 |
| 4 | Number of sipes 30b per unit length in the tire circumferential direction (sipe/mm) | 0.07 | 0.07 | 0.07 |
| 5 | Tortuosity ratio L3/L4 of sipe 30b | 1.03 | 1.03 | 1.03 |
| 6 | Area of small block B1 with respect to area of small block B2 (times) | 1.07 | 1.07 | 1.07 |
| 7 | Relationship between line segment L5 between bending points and maximum width L6 | L5 = L6 | L5 > L6 | L5 > L6 |
| 8 | Presence of raised bottom portions 16d2, 16d3 at both sides in tire width direction of inclined groove 16d | Absent | Absent | Present |
| 9 | Presence of raised bottom portion at both sides in tire width direction of sipe 30b | Absent | Absent | Absent |
| 10 | Extension configuration of inclined grooves 16f, 16h at inner end in the tire width direction | Communicate with circumferential groove 12c, 12d | Communicate with circumferential groove 12c, 12d | Communicate with circumferential groove 12c, 12d |
| 11 | Presence of bent portion in circumferential groove 12b | Absent | Absent | Absent |
| | Steering stability performance on snow-covered road surfaces | 114 | 116 | 116 |
| | Noise-reducing performance | 104 | 104 | 106 |

TABLE 1-4

| Condition No. | | Working Example 9 | Working Example 10 | Working Example 11 |
|---|---|---|---|---|
| 1-1 | Number of bent portions in specific inclined groove 16d | 2 | 2 | 2 |
| 1-2 | Sipe 30b intersection angle (°) | 90 | 90 | 90 |
| 1-3 | Number of bent portions in sipe 30b | 2 | 2 | 2 |
| 2 | Tortuosity ratio L1/L2 of inclined groove 16d | 1.3 | 1.3 | 1.3 |
| 3 | Inclined groove 16d longest extending portion inclination angle (°) | 40 | 40 | 40 |
| 4 | Number of sipes 30b per unit length in the tire circumferential direction (sipe/mm) | 0.07 | 0.07 | 0.07 |
| 5 | Tortuosity ratio L3/L4 of sipe 30b | 1.03 | 1.03 | 1.03 |
| 6 | Area of small block B1 with respect to area of small block B2 (times) | 1.07 | 1.07 | 1.07 |
| 7 | Relationship between line segment L5 between bending points and maximum width L6 | L5 > L6 | L5 > L6 | L5 > L6 |
| 8 | Presence of raised bottom portions 16d2, 16d3 at both sides in tire width direction of inclined groove 16d | Present | Present | Present |
| 9 | Presence of raised bottom portion at both sides in tire width direction of sipe 30b | Present | Present | Present |
| 10 | Extension configuration of inclined grooves 16f, 16h at inner end in the tire width direction | Communicate with circumferential groove 12c, 12d | Terminate in land portion | Terminate in land portion |
| 11 | Presence of bent portion in circumferential groove 12b | Absent | Absent | Present |
| | Steering stability performance on snow-covered road surfaces | 116 | 114 | 116 |
| | Noise-reducing performance | 107 | 109 | 109 |

As can be seen from Tables 1-1 through 1-4, the pneumatic tires of Working Examples 1 to 11, which were within the technical scope of the present technology (satisfied the specific conditions of: number of bent portions in specific inclined groove 16d, sipe 30b intersection angle, and number of bent portions in sipe 30b) all had better steering stability performance on snow-covered road surfaces and noise-reducing performance than the pneumatic tires of the conventional example, which were not within the technical scope of the present technology.

The invention claimed is:

1. A pneumatic tire, comprising:
at least four circumferential grooves, the at least four circumferential grooves comprising a first, second, third and fourth circumferential groove, wherein the first and second circumferential grooves border a first land portion, the second and third circumferential grooves border a rib that includes a tire equatorial plane, and the third and fourth circumferential grooves border a second land portion;
a plurality of inclined grooves;
an inclined groove of the plurality of inclined grooves disposed in the first land portion and/or the second land portion including at least two bent portions;
a sipe being disposed in the first land portion and/or the second land portion so as to intersect the inclined groove at 90°±30°;
the sipe including at least one bent portion;
the rib having a linear edge extending parallel to the tire equatorial plane and a non-linear edge extending non-parallel to the tire equatorial plane, wherein the linear edge extends straight continuously around a circumference of the pneumatic tire;
the plurality of inclined grooves disposed in the rib extending from non-linear edge of the rib and terminating in the rib; and
the rib comprising a plurality of sipes extending from the linear edge of the rib and terminating in the rib without communicating with the plurality of inclined grooves disposed in the rib, the straight continuously extending linear edge of the rib being interrupted only by the plurality of sipes, the plurality of sipes having a groove width of 0.5 mm or greater and less than 1.5 mm and a groove depth of 1.0 mm or greater and less than 10.0 mm; wherein
the non-linear edge forms a zigzag shape including a bent portion; and
each groove of the plurality of inclined grooves extends from the bent portion toward the straight continuously extending linear edge of the rib; and
each groove of the plurality of inclined grooves extends inclined at a same inclination with respect to a tire circumferential direction as a part of the zigzag shape forming the bent portion.

2. The pneumatic tire according to claim 1, wherein in the first land portion and/or the second land portion, a tortuosity ratio L1/L2 of the inclined groove is from 1.1 to 1.5, both inclusive, where L1 is an entire length of the inclined groove and L2 is a dimension between opposite end portions of the inclined groove in the tire width direction.

3. The pneumatic tire according to claim 1, wherein in the first land portion and/or the second land portion, a longest extending portion of the inclined groove has an inclination angle with the tire circumferential direction of from 15° to 60°, both inclusive.

4. The pneumatic tire according to claim 1, wherein in the first land portion and/or the second land portion, a number of the sipes per unit length in the tire circumferential direction is from 0.02/mm to 0.2/mm, both inclusive.

5. The pneumatic tire according to claim 1, wherein a tortuosity ratio L3/L4 of the sipe is 1.01 or greater, where L3 is an entire length of the sipe and L4 is a dimension between opposite end portions of the sipe in the tire width direction.

6. The pneumatic tire according to claim 1, wherein in the first land portion and/or the second land portion, an area of a block bordering one of the circumferential grooves, at least one of the plurality of inclined grooves, and the one or more of the plurality of sipes is 1.05 times or greater an area of a block bordering the inclined groove and the sipe.

7. The pneumatic tire according to claim 1, wherein in the first land portion and/or the second land portion, a line segment that joins bending points on both sides in the tire circumferential direction of the bent portions of the inclined groove is longer than a maximum width of the inclined groove.

8. The pneumatic tire according to claim 1, wherein in the first land portion and/or the second land portion, at least one of the plurality of inclined grooves include a raised bottom at portions adjacent to the circumferential grooves.

9. The pneumatic tire according to claim 1, wherein at least one of the sipes includes a raised bottom at portions adjacent to the inclined grooves.

10. The pneumatic tire according to claim 1, wherein on at least one side in the tire width direction, at least one inclined groove of the plurality of inclined grooves disposed in land portions located outward in the tire width direction of an outermost circumferential groove in the tire width direction of the circumferential grooves terminates within the land portion at an inner end in the tire width direction.

11. The pneumatic tire according to claim 1, wherein at least one of the circumferential grooves located in at least one side region in the tire width direction includes at least one bent portion.

12. The pneumatic tire according to claim 2, wherein in the first land portion and/or the second land portion, a longest extending portion of the inclined groove has an inclination angle with the tire circumferential direction of from 15° to 60°, both inclusive.

13. The pneumatic tire according to claim 12, wherein in the first land portion and/or the second land portion, a number of the sipes per unit length in the tire circumferential direction is from 0.02/mm to 0.2/mm, both inclusive.

14. The pneumatic tire according to claim 13, wherein a tortuosity ratio L3/L4 of the sipe is 1.01 or greater, where L3 is an entire length of the sipe and L4 is a dimension between opposite end portions of the sipe in the tire width direction.

15. The pneumatic tire according to claim 14, wherein in the first land portion and/or the second land portion, an area of a block bordering one of the circumferential grooves, at least one of the plurality of inclined grooves, and the one or more of the plurality of sipes is 1.05 times or greater an area of a block bordering the inclined groove and the sipe.

16. The pneumatic tire according to claim 15, wherein in the first land portion and/or the second land portion, a line segment that joins bending points on both sides in the tire circumferential direction of the bent portions of the inclined groove is longer than a maximum width of the inclined groove.

17. The pneumatic tire according to claim 16, wherein in the first land portion and/or the second land portion, at least one of the plurality of inclined grooves include a raised bottom at portions adjacent to the circumferential grooves.

18. The pneumatic tire according to claim 17, wherein at least one of the sipes includes a raised bottom at portions adjacent to the inclined grooves.

19. The pneumatic tire according to claim 18, wherein on at least one side in the tire width direction, at least one inclined groove of the plurality of inclined grooves disposed in land portions located outward in the tire width direction of an outermost circumferential groove in the tire width direction of the circumferential grooves terminates within the land portion at an inner end in the tire width direction.

20. The pneumatic tire according to claim 19, wherein at least one of the circumferential grooves located in at least one side region in the tire width direction includes at least one bent portion.

21. The pneumatic tire according to claim 1, wherein the first land portion is located at an outer side relative to the rib in the tire circumferential direction and wherein the second land portion is located at an inner side relative to the rib in the tire circumferential direction.

22. The pneumatic tire according to claim 21, wherein the inclined groove including the at least two bent portions is disposed only in the first land portion.

23. The pneumatic tire according to claim 1, wherein the inclined grooves that are disposed in the rib extends from one of the circumferential grooves that define the rib and terminates in the rib.

24. The pneumatic tire according to claim 1, wherein the rib does not include any sipes communicating with the inclined grooves.

25. The pneumatic tire according to claim 1, wherein the plurality of inclined grooves disposed in the rib extends past the tire equatorial plane.

26. A pneumatic tire, comprising:
at least four circumferential grooves, the at least four circumferential grooves comprising a first, second, third and fourth circumferential groove, wherein the first and second circumferential grooves border a first land portion, the second and third circumferential grooves border a rib that includes a tire equatorial plane, and the third and fourth circumferential grooves border a second land portion;
a plurality of inclined grooves;
an inclined groove of the plurality of inclined grooves disposed in the first land portion and/or the second land portion including at least two bent portions;
a sipe being disposed in the first land portion and/or the second land portion so as to intersect the inclined groove at 90°±30°;
the sipe including at least one bent portion;
the rib having a linear edge extending parallel to the tire equatorial plane and a non-linear edge extending non-parallel to the tire equatorial plane, wherein the linear edge extends straight continuously around a circumference of the pneumatic tire;
the plurality of inclined grooves disposed in the rib extending from non-linear edge of the rib and terminating in the rib; and
the rib comprising a plurality of sipes extending from the linear edge of the rib and terminating in the rib without communicating with the plurality of inclined grooves disposed in the rib, the straight continuously extending linear edge of the rib being interrupted only by the plurality of sipes, the plurality of sipes having a groove width of 0.5 mm or greater and less than 1.5 mm and a groove depth of 1.0 mm or greater and less than 10.0 mm;
wherein the plurality of inclined grooves disposed in the rib extend in a same inclination direction as a portion of the inclined groove opening to a same circumferential main groove as the plurality of inclined grooves disposed in the rib.

\* \* \* \* \*